United States Patent [19]
Kemnitz

[11] Patent Number: 5,772,230
[45] Date of Patent: Jun. 30, 1998

[54] TOWING APPARATUS

[76] Inventor: Myron A. Kemnitz, R. R. #1, Cavalier, N. Dak. 58220

[21] Appl. No.: 581,461

[22] Filed: Dec. 29, 1995

Related U.S. Application Data

[63] Continuation-in-part of Ser. No. 298,598, Aug. 31, 1994, abandoned.

[51] Int. Cl.[6] .................................................. B62D 13/00
[52] U.S. Cl. .................................... 280/491.3; 280/479.1; 280/515; 280/501
[58] Field of Search ................................... 280/495, 498, 280/499, 500, 501, 502, 515, 416.2, 479.1, 485, 487, 491.3

[56] References Cited

U.S. PATENT DOCUMENTS

| | | | |
|---|---|---|---|
| 2,459,458 | 1/1949 | Schmitz | 280/487 |
| 2,529,686 | 11/1950 | Green | 280/502 |
| 4,015,855 | 4/1977 | Murray | 280/479.1 |
| 4,389,058 | 6/1983 | Cadwell | 280/515 |
| 4,746,138 | 5/1988 | James | 280/487 |

*Primary Examiner*—Brian L. Johnson
*Assistant Examiner*—Avraham Lerner
*Attorney, Agent, or Firm*—Robert E. Kleve

[57] ABSTRACT

A towing arm device comprising an elongated arm with mounting structure at one end of the arm for pivotally attaching the arm to a tractor hitch at the rear of the tractor to enable pivoting of the arm upward and downward about the axis of the tractor hitch. The towing arm device has an eyelet mounting plate for mounting to the bumper of a truck for towing the truck by the tractor. The arm has a hydraulically actuated latch receivable in the eyelet from beneath the eyelet and hydraulically engagable with the eyelet for latching the other end of the towing arm to the eyelet on the bumper of the truck. The towing arm has a hydraulic piston and cylinder for pivoting the tow arm upward to engage the other end of the towing arm with the eyelet from beneath the eyelet for the latching operation whereby the towing arm may connect the tractor to the truck for the tractor to tow the truck.

5 Claims, 2 Drawing Sheets

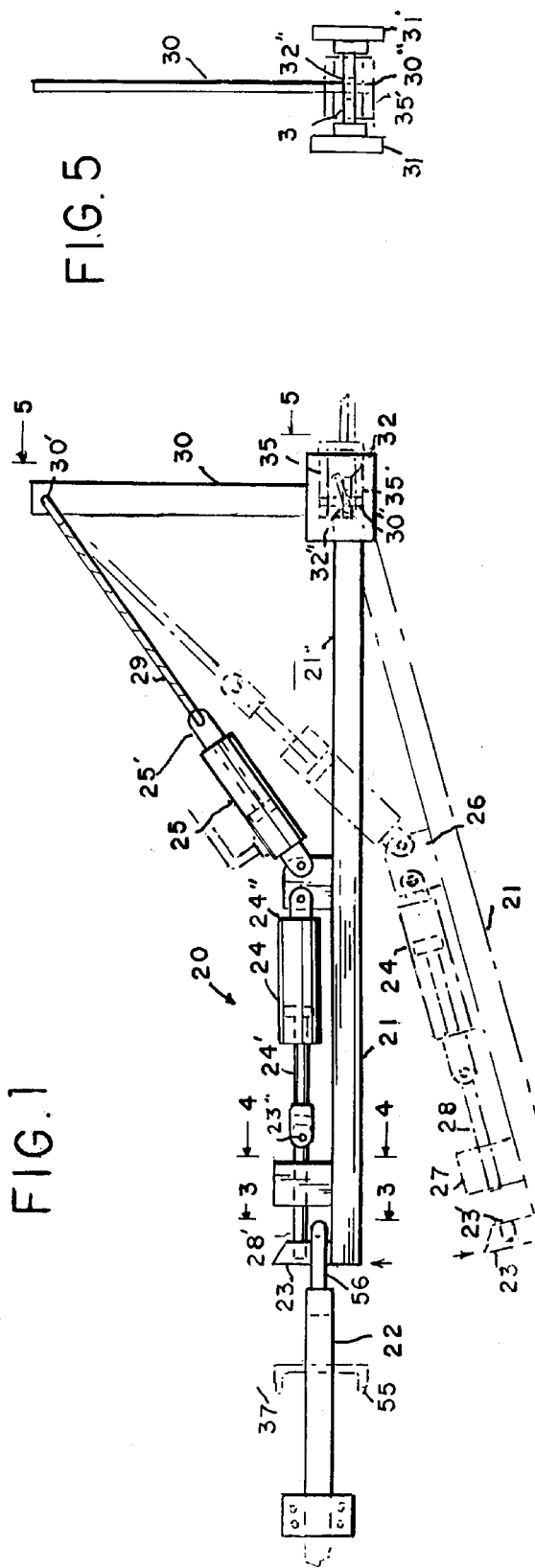

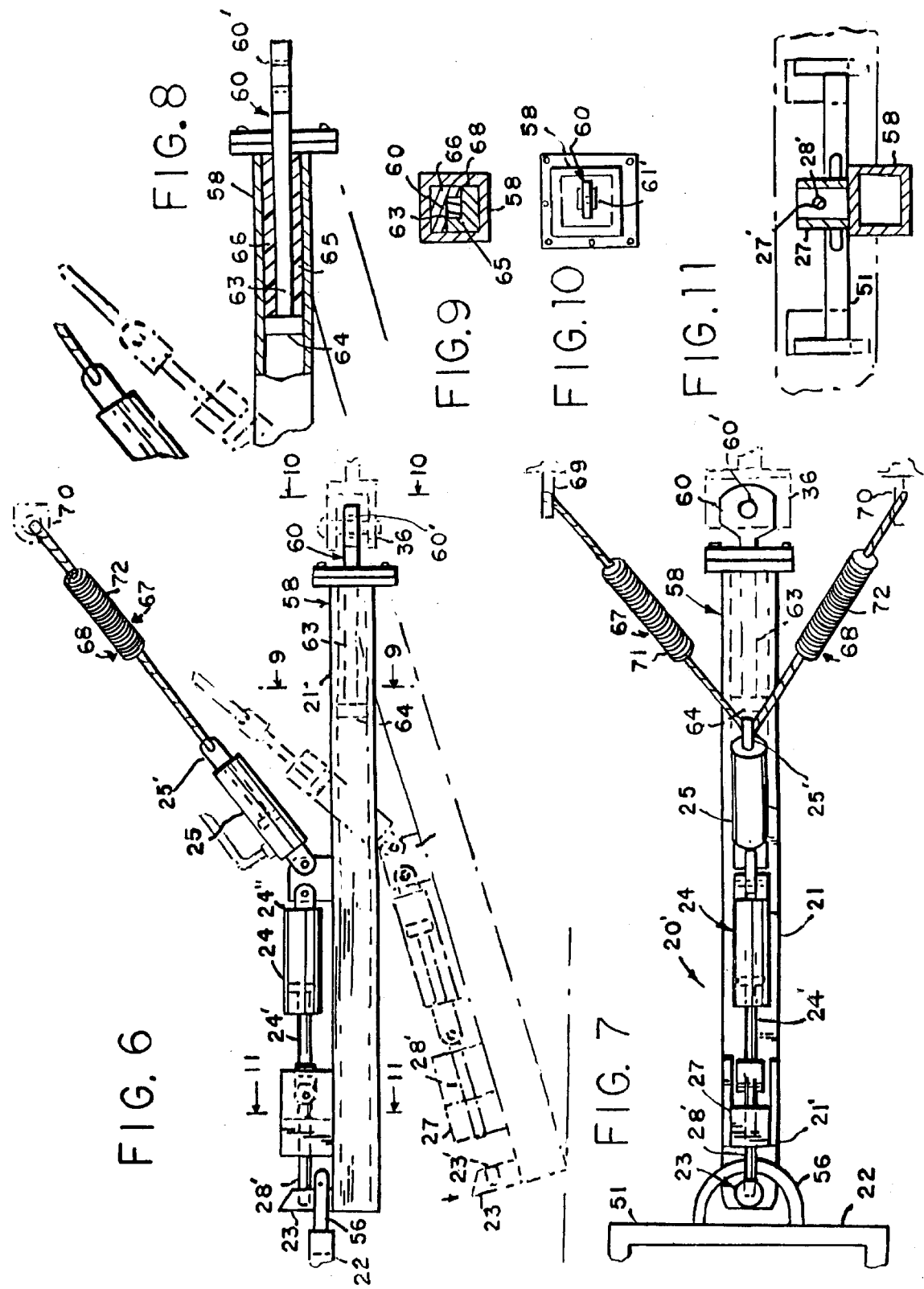

5,772,230

TOWING APPARATUS

This invention relates to towing or pulling apparatus. This application is a continuation in part of my earlier patent application Ser. No. 08/298,598, filed Aug. 31, 1994, now abandoned.

It is an object of the invention to provide a novel towing or pulling arm device for attachment behind a tractor with latch receiving structure for mounting on a vehicle to be towed. The arm device has a hydraulic piston and cylinder for pivoting the arm into engagement with the latch receiving structure and a hydraulic piston and cylinder to actuate latch means to latch the engaged arm with the latch receiving structure.

It is another object of the invention to provide a novel pulling or towing device having a tow arm attachable at one end to the rear of a towing vehicle. The tow arm has fluid actuated means to pivot the arm into engagement with a vehicle to be towed and additional fluid actuated means to attach the arm to the vehicle to be towed.

It is another object of the invention to provide a novel tow arm attachable at one end to a towing vehicle and power operated means on the arm to position and engage the other end of the arm with the vehicle to be towed, with power operated latch means to latch the engagement of the arm with the vehicle to be towed.

Further objects and advantages of the invention will become apparent as the description proceeds and when taken in conjunction with the accompanying drawings wherein:

FIG. 1 is a side elevational view of the hydraulic actuated tow arm invention show attached between a tractor and a truck to be towed, with the towing arm shown in phantom lines before its engagement and latching with the bumper eyelet plate on the truck, and shown in solid lines after the engagement and latching of the towing arm to the eyelet plate.

FIG. 2 is a top plan view of the hydraulic actuated positioning said latching arm and the bumper eyelet mounting plate.

FIG. 3 is a cross-sectional view taken along line 3—3 of FIG. 1.

FIG. 4 is a cross-section view taken along line 4—4 of FIG. 1.

FIG. 5 is an end view taken along line 5—5 of FIG. 1.

FIG. 6 is a side elevational view of a modified hydraulic actuated positioning and latching towing arm having a cushioning sleeve connection at one end of the arm, between the arm and the hitch of the tractor to provide a cushioning between the towing arm and the tractor hitch.

FIG. 7 is a top plan view of the modified hydraulic actuated towing arm with the cushioning connection.

FIG. 8 is a fragmentary enlarged side view of the towing arm with a cutaway to reveal the interior cushioning attachment plate construction.

FIG. 9 is a cross sectional view taken along line 9—9 of FIG. 6.

FIG. 10 is a cross sectional view taken along line 10—10 of FIG. 6.

FIG. 11 is a cross sectional view taken along line 11—11 of FIG. 6.

DETAILED DESCRIPTION OF PREFERRED EMBODIMENT

Briefly stated, the invention comprises a towing arm device. The device has a towing arm with one end attachable to the rear of a tractor, and a bumper eyelet plate attachable to a truck for towing the truck. The towing arm has a hydraulic piston and cylinder actuatable from the tractor to position the other end of the arm into engagement with the eyelet on the bumper of the truck from beneath the eyelet with hydraulic drive means actuatable to engage latch means on the towing arm to the eyelet on the truck for towing the truck by the tractor.

Referring more particularly to the drawings, in FIG. 1, the towing arm invention 20 is illustrated having an elongated main frame arm member 21. A bumper eyelet attachment plate 22 is shown attached to a truck 22' and the towing arm is shown attached at its other end to a tractor 20'.

The towing arm device 20 has a lug member 23 fixed to one end 21' of the arm member 21 and which extends upward therefrom. The lug member 23 has a horizontal bore 23' which extends into one side of the lug. A pair of hydraulic cylinders 24 and 25 each have pistons 24' and 25', respectively, and cylinder portions 24" and 25", respectively, on the arm member 21.

A cylinder mounting plate 26 is fixed to the arm member 21 and projects upward. A rod support block 27 is also fixed to the arm member 21 and projects upward near the one end of the arm member. An elongated slidable rod member 28 is slidably mounted in a bore 27' in the rod support block 27 and is slidable along the bore 27' to slide one end 28' into and out of the bore 23' of the lug 23.

The slidable rod 28 is pivotally mounted at its other end to the outer end of the piston 24' at pivot point 28", so that actuation of the hydraulic cylinder 24 to telescope the piston 24' will slide the rod 28 from right to left, when viewed from FIG. 1, to slide the end 28' of the rod into the bore 23' of lug 23, and deactuation of the hydraulic cylinder 24 retracts the piston 24' to slide the rod 28 out of the bore 23' of the lug to its position shown in phantom lines in FIG. 1, with the end 28' of the rod fully in the block 27.

A cable 29 has its one end 29' mounted to the piston 25' of the cylinder 25. The cable extends rearward and upward and its other end is attached to the top of a vertical elongated rod 30 at eyelet 30'.

At the other end 21" of the towing arm 21 are a pair of side flanges 31 and 31' fixed on opposite sides of the other end of the arm. An elongated plate 32 is fixed between the side flanges 31 and 31' and has an eyelet therethrough.

The vertically elongated plate 30 has a narrow rod member 30" fixed at its lower end. The rod member 30 is adapted to be received in bores in spaced upper and lower plates 35 and 35' of a conventional clevis hitch 36 attached at the rear of a conventional articulated tractor.

The vertically elongated plate rod 30 can be slid downward vertically through the bores in the plates 35 and 35' of a conventional clevis hitch 36 attached at the rear of a conventional articulated tractor.

The vertically elongated plate rod 30 can be slid downward vertically through the bores in the plates 35 and 35' of the hitch and through the bore 30" in the mounting plate of the towing arm 21 to thereby attach the towing arm to the tractor.

The bore 30" in the mounting plate 30 of the towing arm is sufficiently oversized in relation to the outer diameter of the pin or rod lower portion 30' so that the pate 32 and the towing arm fixed to the pate 32 may pivot downward from its position shown in solid lines in FIG. 1 to its position shown in phantom lines in FIG. 1 about pin 30', without the plate 32 bending the pin.

The plates 35 and 35' are spaced sufficiently far enough apart from one another and from opposite side of the plate 32, so that the towing arm 21 may pivot downward about pin 30' under its own weight to its position shown in phantom lines in FIG. 1 without damage to one another, thereby enabling the towing arm 21 to pivot upward and downward at its attachment to the tractor hitch.

The bores 35" of the plates 35 and 35' of the clevis mounting hitch of the tractor are not sufficiently oversized in relation to the pin 30' at the lower end of rod 30, so that the pin and rod will be held snuggly upright in the bores of the plates of the hitch to thereby hold the rod in a fixed relation vertically in relation to the tractor.

The bumper eyelet mounting plate 22 has a main frame 49 with a pair of parallel leg members 50 and 50' fixe to the cross member 51. The leg members 50 and 50' extend rearward in parallel relation to one another. A pair of mounting plates 52 are fixed to the rear ends of leg members 50 and 50'. Diagonal brace members 53 and 53' are fixed between the leg members 50 and 50', respectively, and the cross piece 51.

The truck vehicle 22' to be towed will have a conventional front bumper 55 at its forward end. The truck bumper 55 conventionally has a pair of openings 55' in the bumper, which will be large enough and spaced far enough apart to receive the leg member 50 and 50' so that the leg members 50 and 50' may be inserted through the openings 55' in the bumper until the diagonal brace members 53 and 53' abut the front of the bumper 55.

The mounting plates 52 at the rear end of the leg members 50 and 50' will be bolted onto the conventional bumper support beams 54 and 54', which extend from the frame of the truck to the bumper and are fixed to the bumper to thereby attach the bumper eyelet mounting plate 49 to the bumper of the truck to be towed.

A U shaped eyelet 56 will be fixed to the front of the cross piece member 51 for attachment of the towing arm to the eyelet.

In the operation of the towing arm, the towing arm is attached to a tractor so that it will be pivoted about the tractor hitch 36. The hydraulic lines of the cylinders 24 and 25 will be connected to the hydraulic ports of the tractor so that the cylinders 24 and 25 can be controlled by the tractor.

The bumper eyelet mounting plate 22 will be previously attached to the truck or trucks to be towed.

When it is desired to tow the truck having a mounting plate 52 previously attached thereto, the hydraulic cylinder 25 will be activated to telescope the piston 25' to lower the end 21' of the towing arm near the ground and below the level of the eyelet 56 of the mounting plate 22 attached to the truck.

The hydraulic cylinder 24 will be activated to retract the piston 24' of the cylinder 24 into the cylinder portion 24", as shown in phantom lines in FIG. 1.

Whereupon, the tractor of the articulated type will be backed up toward the front of the truck to position the lug 23 of the towing arm 21 directly beneath the eyelet 56 of the mounting plate 22 on the truck.

Whereupon, the hydraulic cylinder 25 will be activated in the opposite direction to retract the piston 25' into cylinder 25" to raise the one end of the arm up from its position shown in phantom lines until the lug 23 is received in the eyelet 56, as shown in solid lines in FIG. 1. The piston 25' will be held in its position in the cylinder 25" hydraulically from the tractor; and the cylinder 24 will be activated in the opposite direction to telescope its piston 24' and the piston extension over the top of the eyelet 56 and into the bore 23' of the lug 23 to lock the eyelet with the towing arm 21 with the piston extension of piston 24 across the top of the eyelet 56 and the main frame of the arm beneath the eyelet 56, as shown in solid lines in FIG. 1.

Whereupon, the tractor may be driven forward to tow the truck by the eyelet connection to the towing arm of the tractor through the fields.

The towing operation will be normally used in the agricultural fields when the fields become too wet from rain and moisture during harvesting time for the harvesting trucks to move easily in the fields entirely under their own power, and the trucks need the assistance of towing from tractors as the trucks move beside the harvester through the fields.

Reversing the operation just described accomplishes the detachment of the towing arm from the eyelet on the truck. The hydraulic operation enables the attachment and detachment of the towing arm to the eyelet on the truck to be accomplished by an operator on the tractor without the operator having to leave the tractor.

It is preferable to have the towing arm 20 pivoted upward into engagement with the eyelet 56 from its pivoted mounting to the tractor; so that should the towing arm be incorrectly positioned during the attachment, it will not accidentally engage the radiator of the truck or hood which might occur if the arm were pivoted downward into engagement into the eyelet and cause extensive damage to the truck. If the upward movement of the arm is out of position, the arm will necessarily engage the bumper and the bumper will stop the upward action of the towing arm before the arm can engage any portion of the truck which might be more easily damaged.

Modified Towing Arm Attachment:

A modified towing arm attachment invention 20' is illustrated in FIGS. 6–11, inclusive, and has the subject matter being added by this continuation in part application. The modified towing attachment has a towing arm 58 with a square hollow elongated main beam 59, instead of the flat main beam 21 of the first form of the invention.

The hollow, rectangular, elongated main beam 59 serves the same purpose as its one end for its attachment to the bumper plate of the truck to be towed as in the first form of the invention. The structure of the latching mechanism is the same as in the first form. The modified invention 20' has a lug 23 fixed to the one end of the hollow beam 59. A pair of hydraulic cylinders 24 and 25 are mounted on the main beam 59. The hydraulic cylinder 24 hydraulically actuates its piston 24' to slide the rod 28, fixed to the outer end of piston 24', outward, sliding in the bore of lug 27 fixed to beam 59, outward, into the bore 23' of lug 23 to detachable lock the one end of the beam 59 to the U shaped eyelet 56; which eyelet is fixed to the bumper plate 22 and which bumper plate 22 is attached to the front bumper of the truck to be towed, as in the first form of the invention.

At the other end of the beam 59 of the towing arm 58 is an elongated towing plate 60, slidably mounted in the other end of the beam 59. The plate 60 has an eyelet 60', for attachment by a pin 60" to the conventional tractor hitch 36 fixed to the rear of the tractor for towing.

The plate 60 is elongated and is slidable along the length of the beam 58, in a slot 61' in an end plate 61 fixed across the other end of the hollow beam. The towing plate 60 has a reducedds width along its intermediate portion 63, and the slot 61' has a width sufficiently large to just accommodate this reduced width of the towing plate so that the towing plate 60 can slide in the slot 61'.

At the inner end of the sliding plate 60, inside the beam 59, is a lateral plate 64' fixed across the inner end 64 of the plate 60. A pair of resilient, plastic foam L shaped cushioning members 65 and 66 surround the reduced width portion 63 of the towing plate 60, between the end plate 64' of the towing plate 60 and the end plate 61 fixed across the end of the hollow beam 59 of the towing arm 58.

The resilient cushioning members 65 and 66 serve to cushion a sudden pulling movement away or from left to right when viewed from FIG. 6 when the tractor is attached to the towing arm attachment 22 through its hitch 36, and the towing arm attachment 20' is attached to the front of the truck to be towed, through the bumper plate 22. This sudden pulling action away by the tractor, by the movement of the tractor and its tractor hitch forward or left to right, will pull the end plate 64 of the plate 60 toward the end plate 61 of the beam or arm 59, compressing the foam cushion members 65 and 66 therebetween. The cushion members being resilient will compress more gradually and will gradually slow the sudden pulling or towing movement of the tractor from left to right away from the beam 59 or towing arm, reducing the jarring effect and reducing the possibility of this sudden movement causing damage to the towing invention 20' or the truck being towed or the bumper plate. This compressing action upon the cushioning members is an endwise compression, compressing the remote ends of the cushion members toward one another, with the foam members providing the cushioning action. The cushioning members 65 and 66 will expand after the initial compression, being resilient, and tend to cause the sliding plate 60 to resume its initial position relative to the beam 59, particularly once the pulling action is completed.

The rectangular, hollow beam 59 is sufficiently larger than its width, than the L shaped cushioning members 65 and 66 in all lateral directions to allow the cushioning members 65 and 66 to laterally expand toward the sides of the hollow beam sufficiently to allow a gradual slowing of the movement of the sliding plate from let to right and ultimately stopping the endwise movement of the plate 60, when the endwise compression of the cushioning members occur, under the sudden pulling action. The lateral expansion takes place in the space 68 between the cushioning members 65 and 66 and the inside of the beam 59.

The two foam cushion members 65 and 66 are elongated and have an L shaped cross section, so that when placed about the reduced width portion 63 of the plate 60 form a rectangular cross section to fit within the rectangular cross section of the hollow beam 59 forming the modified towing arm, and surround the tow plate 60. The tow plate 60 has an enlarged width at its outer end 60' which engages against the end plate 61 of the beam 59 when the towing plate is moved toward the beam 59, and thus prevents the inward movement of the plate while allows outward compressing movement of the towing plate relative to the beam 59.

This cushioning action provided by the modification thus acts to cushion the initial pulling action of the tractor away from the truck, after the towing arm 58 has been attached between the tractor and the bumper of the truck being towed.

In this modified form of the invention, which is the preferred form of the invention; the piston rod 25' of piston 25 is attached to the tractor by two cable attachments 67 and 68 rather than one cable attachment 29, as in the first form of the invention. A pair of mounting lugs 69 and 70 are fixed to the tractor doing the towing.

The cable attachment 67 has an upper and lower cable section with its inner ends attached to a spring 71 and its outer ends attached between the piston rod and the lug 69 to provide a cushioning connection between the piston rod and the tractor; and the cable attachment 68 has a similar upper and lower cable section with its inner ends attached by a spring 72 and its outer ends attached to the piston rod 25' and the lug 70 to provide a similar cushioning connection between the piston rod 25' and the tractor. The cable attachments 67 and 68 diverge outwardly from one another to provide more stability to the connection.

The springs 71 and 72 are sufficiently strong to support the weight of the towing arm 58 in its pivotal connection about hitch 36 by its connection through its cable sections to piston 25' without the springs expanding; so that the towing arm attachment 58 may be lowered about hitch 36, by telescoping outward hydraulically the piston rod 25' from the piston 25 to place the lug 23 beneath the U shaped eyelet 56, and then raised about the hitch 36 to insert the lug 23 upward through the eyelet 56, and then the hydraulic cylinder 24 can be activated to project the piston 24' and its rod 28 over the top of the eyelet into the bore 23' in the lug 23 to lock this one end of the towing arm 58 to the bumper plate 22 mounted on the truck, in a manner substantially the same as in the first form of the invention.

It will be obvious that various changes and departures may be made to the invention without departing from the spirit and scope thereof; and accordingly, it is not intended that the invention be limited to that specifically described in the specification or as illustrated in the drawings, but only as set forth in the appended claims wherein:

What is claimed is:

1. A towing arm device for attachment between a tractor having a tractor hitch and a vehicle having a front bumper comprising an elongated towing arm and a front bumper attachment means, said arm having tractor attachment means at a forward end for attachment of said arm to said hitch at the rear of said tractor to pivot said arm about a horizontal axis on said hitch, said front bumper attachment means having an eyelet at a forward end and attachment means at a rearward end for attachment to the front bumper of the vehicle with the eyelet extending horizontally forward therefrom, said arm extending rearward in length and having a spike fixed at the rearward end of the arm and projecting laterally and upwardly therefrom, a first fluid actuated piston and cylinder means adapted to be connected between said tractor and said arm to raise said arm upward at the rearward end about a pivotal mounting to said tractor, whereby said spike at said rearward end of said arm may be raised in an arc about said pivotal mounting up through said eyelet on said bumper attachment means, said spike having a generally horizontal bore in an upper end whereby said spike when raised upward through said eyelet will have said horizontal bore beyond said eyelet with said arm on the other side of said eyelet, a second fluid actuated piston and cylinder means mounted on said arm and a rod slidably mounted on said arm on the side of the eyelet opposite the spike, said second fluid actuated piston and cylinder means being adapted on actuation to project said rod across said eyelet on the side of the eyelet opposite the arm and into the bore in the spike to lock the rearward end of the arm to the eyelet on the bumper in a pivotal relation for towing the vehicle by the tractor.

2. A towing arm device for attachment between a tractor hitch and a vehicle having a front bumper comprising an elongated towing arm and a front bumper attachment, said arm extending rearward in length with a spike fixed to a rearward end and projecting laterally therefrom, said bumper attachment having an eyelet mounted at a forward end and attachment means at a rearward end for attachment to the front bumper of said vehicle, said arm having pivotal means forward of said spike for pivoting at least the rearward portion of the arm including said spike in an arc about a pivotal mounting vertically through said eyelet on said bumper attachment, said spike having rod receiving bore means at an outer end whereby said spike when extended vertically through said eyelet said rod receiving bore means will extend beyond said eyelet with said arm on the other side of said eyelet, fluid actuated means to pivot said arm vertically through said eyelet, a second fluid actuated piston and cylinder means, a slidable rod on said arm slidable across said eyelet into said bore means on said spike, said second fluid actuated piston and cylinder means being adapted upon actuation to project said rod across said eyelet into the rod receiving bore in the spike to lock the rearward end of the arm to the eyelet on the bumper in a pivotal relation for towing the vehicle by the tractor, said means adjacent the forward end of the arm including a cushioning means for cushioning the forward end of the arm to the tractor hitch to a sudden pulling action of the tractor upon the towing arm, when the tractor pulls the arm to pull the vehicle attached to the towing arm.

3. A towing arm device for attachment between a tractor having a towing hitch and a vehicle having a front bumper comprising an elongated towing arm and a front bumper attachment means, said arm having tractor attachment means at a forward end for attachment of said arm to said tractor hitch whereby said arm may pivot vertically about an axis adjacent said hitch, said bumper attachment means having an eyelet at a forward end, said arm extending in length rearward and having a spike fixed at a rearward end projecting laterally of the arm, a first fluid actuated piston and cylinder means connected between said tractor and said arm to pivot said arm upward about said pivotal connection, whereby the spike at the rear of the arm may be raised in an arc about a pivotal mounting up through said eyelet on said bumper attachment means for attaching said arm to said bumper attachment means, said spike having a rod receiving means at a upper end rearward beyond said eyelet, a rod and a second fluid actuated piston and cylinder means mounted on said arm forward of said eyelet with said second piston and cylinder means upon actuation acting to project said rod rear across said eyelet into said rod receiving means of said spike to lock the rear of the arm to the eyelet of the bumper attachment means in pivotal relation for towing the vehicle with the tractor.

4. A towing arm device according to claim 3 wherein cushioning means are provided between said arm and said arm attachment means to cushion sudden pulling movement of the tractor upon the arm when the arm is attached to the tractor at said forward end and the bumper attachment plate is attached to the vehicle at said rearward end.

5. A towing arm device for attachment between a tractor having a tractor hitch and vehicle having a front bumper comprising an elongated arm means and a bumper attachment means for attachment between the tractor hitch of a tractor and the bumper of a vehicle, said arm means having hitch means at a forward end for attachment of the arm to the tractor hitch, slidable cushioning means mounted between a forward portion of the arm rearward of the arm hitch means and a rearward portion of the arm cushioning the forward and rearward portions of the arm and thereby adapted to provide cushioning between the forward portion of the arm means and the tractor hitch, said bumper attachment means being attachable to a bumper of a vehicle for towing the vehicle with the tractor, a detachably connected spike means and an eyelet means detachably connected together with one of said spike and eyelet means mounted to said bumper attachment means at a forward end and the other of said spike and eyelet means mounted to said arm means at a rearward end with said spike means and eyelet means when engaged detachably engaging said arm means at the rearward end to said bumper means, said arm means having tractor attachment means at a forward end for attachment of said arm to said tractor hitch, said arm means having pivotal mounting means adjacent the forward end for pivoting the rearward end of said arm means upward about said pivotal mounting on a horizontal axis relative to the tractor hitch, a first fluid actuated means on said arm means to pivot said arm means upward in an arc about said pivotal mounting to said tractor hitch for engagement of said spike means into said eyelet means to engage said arm with said bumper attachment means, a second fluid actuated latch means to latch said eyelet and spike means together to detachably latch the rearward end of said arm means to said bumper means when said arm means is upwardly engaged to said bumper attachment means to enable said tractor to tow the vehicle.

\* \* \* \* \*